United States Patent
Otsuka et al.

(10) Patent No.: US 11,643,147 B2
(45) Date of Patent: May 9, 2023

(54) FRONT PILLAR OUTER

(71) Applicant: NIPPON STEEL CORPORATION, Tokyo (JP)

(72) Inventors: Kenichiro Otsuka, Tokyo (JP); Masafumi Azuma, Tokyo (JP); Naoki Kimoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/625,670

(22) PCT Filed: Jul. 14, 2020

(86) PCT No.: PCT/JP2020/027346
§ 371 (c)(1),
(2) Date: Jan. 7, 2022

(87) PCT Pub. No.: WO2021/010389
PCT Pub. Date: Jan. 21, 2021

(65) Prior Publication Data
US 2022/0258806 A1  Aug. 18, 2022

(30) Foreign Application Priority Data
Jul. 16, 2019 (JP) .............................. JP2019-131349

(51) Int. Cl.
*B62D 25/04* (2006.01)
*B62D 27/02* (2006.01)

(52) U.S. Cl.
CPC .................................. *B62D 25/04* (2013.01)

(58) Field of Classification Search
CPC .............................. B62D 25/04; B62D 27/023

USPC ....................................... 296/193.06, 29, 30
See application file for complete search history.

(56) References Cited

U.S. PATENT DOCUMENTS

| | | |
|---|---|---|
| 2006/0255624 A1 | 11/2006 | Zimmerman et al. |
| 2013/0113237 A1 | 5/2013 | Huhn |
| 2016/0167713 A1 | 6/2016 | Chung |
| 2017/0106917 A1 | 4/2017 | Mashio et al. |
| 2021/0061362 A1 | 3/2021 | Otsuka |

FOREIGN PATENT DOCUMENTS

| | | |
|---|---|---|
| CN | 101208236 A | 6/2008 |
| CN | 105691463 A | 6/2016 |
| CN | 108556924 A | 9/2018 |
| DE | 43 00 398 A1 | 7/1994 |

(Continued)

*Primary Examiner* — Dennis H Pedder
(74) *Attorney, Agent, or Firm* — Birch, Stewart, Kolasch & Birch, LLP

(57) ABSTRACT

An objective of the present disclosure is to provide a front pillar outer that is inexpensive, lightweight and strong. A front pillar outer includes a glass-face-side flange part, a door-side flange part, and a main body part that connects the glass-face-side flange part and the door-side flange part to each other. In a partial area of the door-side flange part in a longitudinal direction thereof, a first plate part that is connected to a side edge of the door-side flange part is folded so that the first plate part is overlaid on the door-side flange part. In a partial area of the glass-face-side flange part in a longitudinal direction thereof, a second plate part that is connected to a side edge of the glass-face-side flange part is folded so that the second plate part is overlaid on the glass-face-side flange part.

5 Claims, 7 Drawing Sheets

(56) References Cited

FOREIGN PATENT DOCUMENTS

| | | |
|---|---|---|
| DE | 10 2015 100 195 A1 | 7/2016 |
| EP | 3 050 731 A1 | 8/2016 |
| JP | 5-310147 A | 11/1993 |
| JP | 2014-118009 A | 6/2014 |
| JP | 2016-2781 A | 1/2016 |
| JP | 2016-141243 A | 8/2016 |
| WO | WO 2019/139151 A1 | 7/2019 |

FRONT PILLAR OUTER

TECHNICAL FIELD

The present invention relates to a front pillar outer that forms a front pillar.

BACKGROUND ART

A vehicle body of an automobile includes a front pillar. The front pillar is formed by a combination of a front pillar inner, a front pillar outer and the like. From the viewpoint of improving the fuel consumption of the automobile, the front pillar is desirably lightweight. On the other hand, from the viewpoint of improving the collision safety, the front pillar desirably has high strength. Therefore, there is a demand for reducing the weight and improving the strength of the front pillar.

Vehicle body components improved in strength are described in Japanese Patent Application Publication No. 2014-118009 (Patent Literature 1), Japanese Patent Application Publication No. 5-310147 (Patent Literature 2), and Japanese Patent Application Publication No. 2016-2781 (Patent Literature 3), for example.

In Patent Literature 1, a front pillar lower provided with a reinforcement component is described. The reinforcement component described in Patent Literature 1 includes a vertical face part opposed to a front wheel and a horizontal face part having high strength. When a head-on collision of the vehicle occurs, the front wheel moves toward the rear of the vehicle. The vertical face part limits the movement of the front wheel toward the rear of the vehicle. The horizontal face part absorbs the collision energy applied to the vertical face part. In Patent Literature 1, it is disclosed that the deformation of the front pillar lower caused by the collision can be reduced in this way.

The vehicle body component disclosed in Patent Literature 2 has a first structure that has a closed cross section, and a second structure that has a closed cross section and is welded to the first structure. Therefore, the vehicle body component includes a portion formed by only the first structure and a portion formed by the first structure and the second structure. In short, the vehicle body component includes two portions having different plate thicknesses. In Patent Literature 2, it is disclosed that the collision energy absorption capacity of the vehicle body component is improved in this way.

The vehicle body component disclosed in Patent Literature 3 has a first component having a U-shape, and a second component having a U-shape. A slit is formed in each of an end part of the first component and an end part of the second component. With the slit of the first component being arranged to overlap with the slit of the second component, the first component and the second component are welded to each other. In other words, in a part of the vehicle body component, the two components overlap with each other, and therefore, the strength is increased. In Patent Literature 3, it is disclosed that the vehicle body component has high strength even if the vehicle body component is not provided with a reinforcement plate or the like as a separate member.

In other techniques for reducing weight and improving strength than Patent Literatures 1 to 3, a tailored welded blank (referred to also as TWB, hereinafter) or a tailored rolled blank (referred to also as TRB, hereinafter) can be used as the material of the front pillar. Alternatively, a reinforcement plate can also be attached to a part of the front pillar.

TWB is a material formed by a plurality of metal plates that are different in material or plate thickness and combined by welding. A component made of TWB partially has one or both of variations in plate thickness and variations in strength.

TRB is a metal plate that is formed by special rolling and has a continuously varying plate thickness. A component made of TRB partially has one or both of variations in plate thickness and variations in strength.

CITATION LIST

Patent Literature

Patent Literature 1: Japanese Patent Application Publication No. 2014-118009
Patent Literature 2: Japanese Patent Application Publication No. 5-310147
Patent Literature 3: Japanese Patent Application Publication No. 2016-2781

SUMMARY OF INVENTION

Technical Problem

However, the front pillar lower described in Patent Literature 1 is provided with a reinforcement component as a separate member. The vehicle body component described in Patent Literature 2 has the second structure that is welded to the first structure along the longitudinal direction of the first structure. With the vehicle body component described in Patent Literature 3, the first component and the second component are welded over the entire cross section in the weld zone of the first component and the second component. Therefore, the vehicle body components according to Patent Literatures 1 to 3 are heavy.

In addition, since TWB is a plurality of metal plates joined to each other, an additional joining process is needed for producing TWB. Therefore, components formed from TWB are expensive. A joining process is also needed for producing a component reinforced with a reinforcement plate. Therefore, such a component is also expensive. Production of TRB is highly costly. Therefore, components formed from TRB are also expensive.

An objective of the present invention is to provide a front pillar outer that is inexpensive, lightweight and strong.

Solution to Problem

A front pillar outer according to an embodiment of the present invention includes a glass-face-side flange part, a door-side flange part, and a main body part that connects the glass-face-side flange part and the door-side flange part to each other. In a partial area of the door-side flange part in a longitudinal direction thereof, a first plate part that is connected to a side edge of the door-side flange part is folded so that the first plate part is overlaid on the door-side flange part. In a partial area of the glass-face-side flange part in a longitudinal direction thereof, a second plate part that is connected to a side edge of the glass-face-side flange part is folded so that the second plate part is overlaid on the glass-face-side flange part.

Advantageous Effects of Invention

The front pillar outer according to the embodiment of the present invention is inexpensive, lightweight and strong.

DESCRIPTION OF EMBODIMENT

Figure 1:
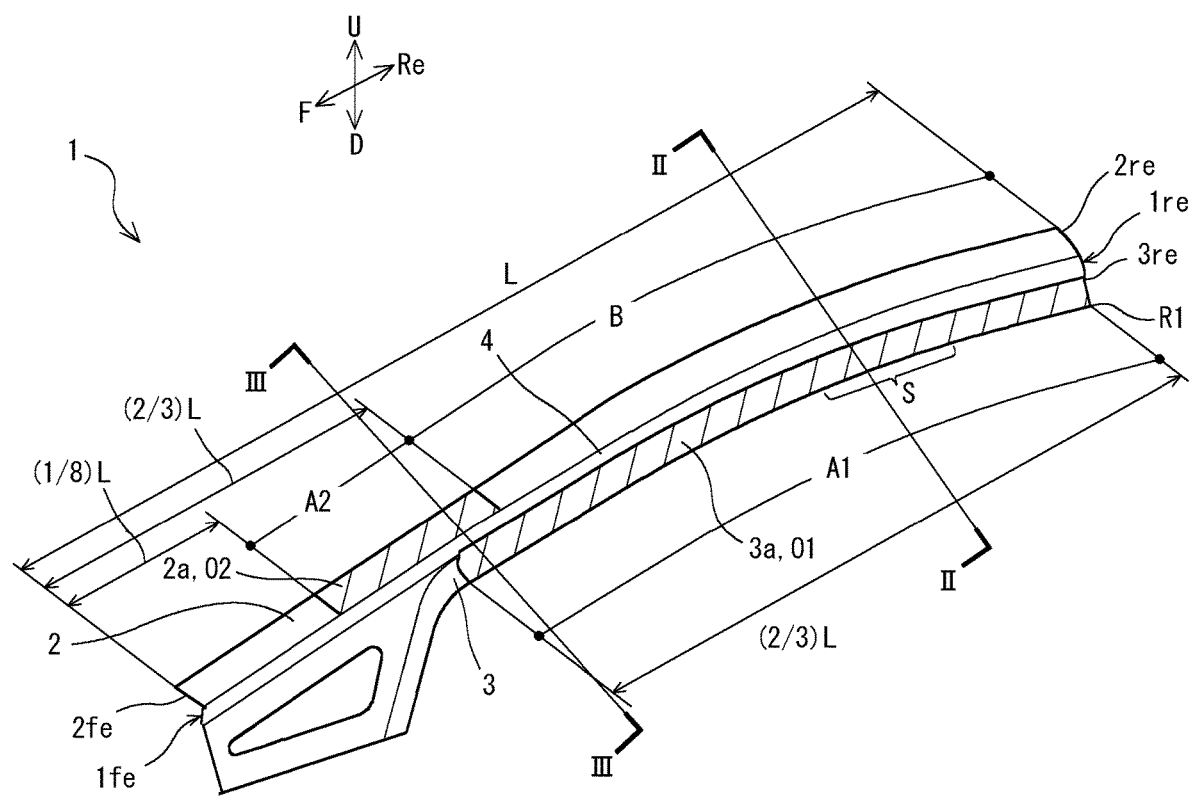
FIG. 1 is a perspective view of an example of a front pillar outer according to an embodiment.

In the following, an embodiment of the present invention will be described. Although examples of the embodiment of the present invention will be described below, the present invention is not limited to the examples described below. Although particular numerical values or particular materials may be referred to as examples in the following description, the present invention is not limited to such examples.

A front pillar outer according to this embodiment includes a glass-face-side flange part, a door-side flange part, and a main body part that connects the glass-face-side flange part and the door-side flange part to each other. In a partial area of the door-side flange part in a longitudinal direction thereof, a first plate part that is connected to a side edge of the door-side flange part is folded so that the first plate part is overlaid on the door-side flange part. In a partial area of the glass-face-side flange part in a longitudinal direction thereof, a second plate part that is connected to a side edge of the glass-face-side flange part is folded so that the second plate part is overlaid on the glass-face-side flange part.

When a collision load is applied to the front pillar outer according to this embodiment, the front pillar outer is curved. As a result, a compressive strain is exerted on a partial area of the door-side flange part along the longitudinal direction. In this specification, the area on which the compressive strain is exerted is referred to also as a "door-side compressive region". On the other hand, a tensile strain is exerted on a partial area of the glass-face-side flange part along the longitudinal direction. In this specification, the area on which the tensile strain is exerted is referred to also as "glass-face-side tensile region". Furthermore, a compressive strain is exerted on another partial area of the glass-face-side flange part along the longitudinal direction. In this specification, the area on which the compressive strain is exerted is referred to also as a "glass-face-side compressive region". The door-side compressive region and the glass-face-side compressive region are generically referred to also as a compressive strain region. The glass-face-side tensile region is generically referred to also as a "tensile strain region". In a collision, the compressive strain region is likely to buckle.

With the front pillar outer according to this embodiment, in the door-side compressive region, the first plate part is arranged and overlaid on the door-side flange part. Furthermore, in the glass-face-side compressive region, the second plate part is arranged and overlaid on the glass-face-side flange part. In short, in both the door-side compressive region and the glass-face-side compressive region, two layers of material are stacked on one another. Here, the collision resistance of the compressive strain region is approximately proportional to the product of the strength of the material and the third power of the plate thickness of the material. Therefore, increasing the plate thickness of the material of the compressive strain region greatly contributes to the improvement of the collision resistance. Specifically, the collision resistance is buckling strength. With the front pillar outer according to this embodiment, in the compressive strain regions (the door-side compressive region and the glass-face-side compressive region), two layers of material are stacked on one another, and the plate thickness is substantially increased. Therefore, the buckling strength of the compressive strain region is significantly improved. In this way, the strength of the front pillar outer can be increased.

With the front pillar outer according to this embodiment, the glass-face-side tensile region is formed by a single material. Here, the collision resistance of the tensile strain region is proportional to the product of the strength of the material and the plate thickness of the material. Therefore, increasing the plate thickness of the material of the tensile strain region makes a smaller contribution to the improvement of the collision resistance than increasing the plate thickness of the material of the compressive strain region. In order to improve the collision resistance of the tensile strain region, the strength of the material can be increased. If the strength of the material is increased, the collision resistance of the compressive strain region is further improved. With the front pillar outer according to this embodiment, the plate thickness of the tensile strain region does not increase. Therefore, an increase of the weight can be reduced, and the weight of the front pillar outer can be reduced by increasing the strength of the material.

With the front pillar outer according to this embodiment, in the door-side compressive region, the first plate part that is integral with the door-side flange part is folded onto the door-side flange part, so that two layers of material are stacked on one another. Furthermore, in the glass-face-side compressive region, the second plate part that is integral with the glass-face-side flange part is folded onto the glass-face-side flange part, so that two layers of material are stacked on one another. In short, in both the door-side compressive region and the glass-face-side compressive region, two members separately formed do not need to be joined to each other, and folding the first plate part and the second plate part suffices. Therefore, the front pillar outer can be inexpensively produced.

Folding of each of the first plate part and the second plate part is preferably achieved by hot stamping. In the case where the folding is achieved by hot stamping, the temperature of the material is high during the processing, and therefore, the ductility of the material is high. Therefore, even though the first plate part is folded at an acute angle at the side edge of the door-side flange part, no crack occurs in the folded part. Similarly, even though the second plate part is folded at an acute angle at the side edge of the glass-face-side flange part, no crack occurs in the folded part. However, the folding of each of the first plate part and the second plate part can also be achieved by cold pressing, depending on the properties of the material.

The direction in which each of the first plate part and the second plate part is folded is not particularly limited. Specifically, the first plate part may be folded so as to be exposed to the outside of the front pillar outer or may be folded so as to be hidden behind the front pillar outer.

Similarly, the second plate part may be folded so as to be exposed to the outside of the front pillar outer or may be folded so as to be hidden behind the front pillar outer.

However, when it is required to ensure an intimate contact with another component, for example, the direction of folding of the first plate part and the second plate part needs to be determined based on the details of the problem. For example, when the windshield needs to rest on and be in intimate contact with the glass-face-side flange part, if the first plate part and the second plate part are folded to the front side, a step is formed on the glass-face-side flange part, and there is a possibility that the windshield is not in intimate contact with the glass-face-side flange part. If this is a problem, the first plate part and the second plate part need to be folded to the back side.

The front side and the back side of the front pillar outer referred to here means the front side and the back side of the front pillar outer installed in an automobile. Specifically, the front side of the front pillar outer means the outer side of the front pillar outer, and the back side of the front pillar outer means the inner side of the front pillar outer.

In the front pillar outer according to this embodiment, provided that a length of the glass-face-side flange part is denoted by L, the area in which the first plate part and the door-side flange part overlap with each other is preferably provided in the door-side flange part over a part or the whole of a range between a position corresponding to a rear end of the glass-face-side flange part and a position at a distance of $L \times 2/3$ from the position corresponding to the rear end of the glass-face-side flange part.

In many cases, when a collision load is applied to the front pillar outer, a large compressive strain is likely to occur in the door-side flange part in the curved area close to the rear end of the front pillar outer. In other words, the door-side compressive region is likely to be disposed close to the rear end of the front pillar outer. Therefore, if the first plate part and the door-side flange part overlap with each other over a part or the whole of such a range, buckling of the front pillar outer can be further reduced.

In the front pillar outer according to this embodiment, provided that a length of the glass-face-side flange part is denoted by L, the area in which the second plate part and the glass-face-side flange part overlap with each other is preferably provided over a part or the whole of a range between a position at a distance of $L \times 1/8$ from a fore end of the glass-face-side flange part and a position at a distance of $L \times 2/3$ from the fore end of the glass-face-side flange part.

When a collision load is applied to the front pillar outer, a large compressive strain is likely to occur in the glass-face-side flange part in the vicinity of the fore end of the front pillar outer. In other words, the glass-face-side compressive region is likely to be disposed close to the fore end of the front pillar outer. Therefore, if the second plate part and the glass-face-side flange part overlap with each other over a part or the whole of such a range, buckling of the front pillar outer can be further reduced.

In the front pillar outer described above, the plate thickness is not particularly limited. Practically, the plate thickness is preferably 0.60 mm or more to 1.60 mm or less. The lower limit of the plate thickness is more preferably 0.85 mm. The upper limit of the plate thickness is more preferably 1.05 mm. The tensile strength (the strength of the material) of the front pillar outer is preferably 800 MPa or more. The lower limit of the tensile strength is more preferably 1200 MPa.

Note that in the area in which the first plate part and the door-side flange part overlap with each other, the first plate part and the door-side flange part may be joined to each other. Similarly, in the area in which the second plate part and the glass-face-side flange part overlap with each other, the second plate part and the glass-face-side flange part may be joined to each other. The joining method is welding, for example. The welding method may be laser welding or spot welding, for example. The joining method may be mechanical fastening or bonding using an adhesive, for example. Some of these joining methods can also be used in combination.

In this case, the front pillar outer is suitable as a front pillar outer for an automobile.

In this specification, each direction of the front pillar outer means a direction of the front pillar outer installed in an automobile. For example, "forward", "rearward", "left", "right", "upward", and "downward" directions agree with the respective directions of an automobile. In the drawings, symbols "F", "Re", "Le", "R", "U", and "D" mean forward, rearward, left, right, upward, and downward directions of an automobile. In this specification, unless otherwise specified, the term "longitudinal direction" means a direction from the fore end to the rear end of the front pillar outer. The term "cross section" means a cross section that is perpendicular to the longitudinal direction of the front pillar outer.

In the following, the embodiment of the present invention will be described in detail with reference to the drawings. In the drawings, the same or corresponding parts are denoted by the same reference numerals, and redundant descriptions thereof will be omitted.

[Front Pillar Outer 1]

Figure 2:
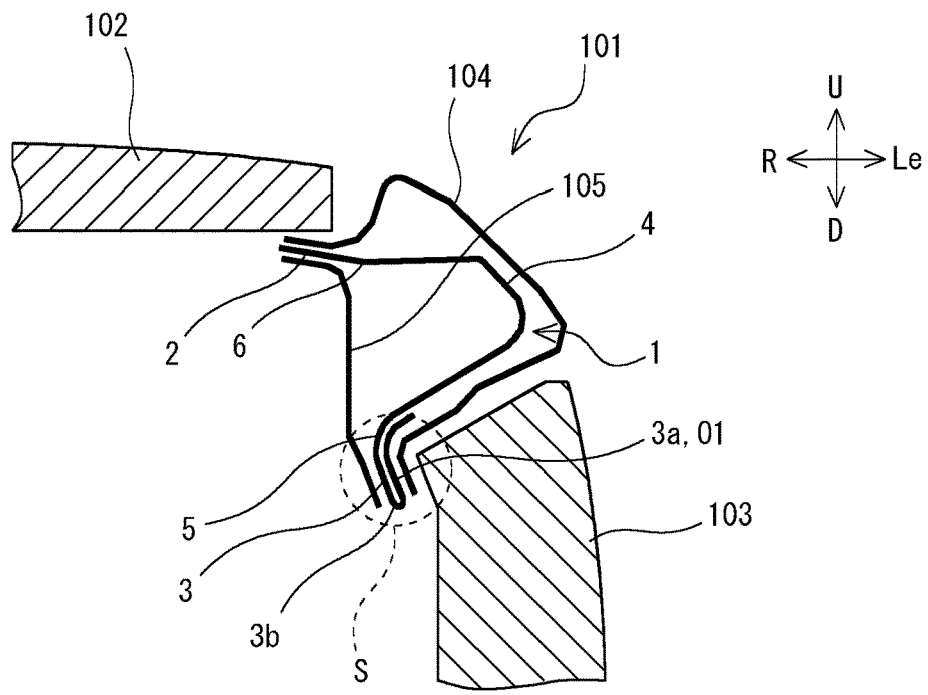
FIG. 2 is a cross-sectional view of a front pillar taken along a line II-II in FIG. 1.
Figure 3:
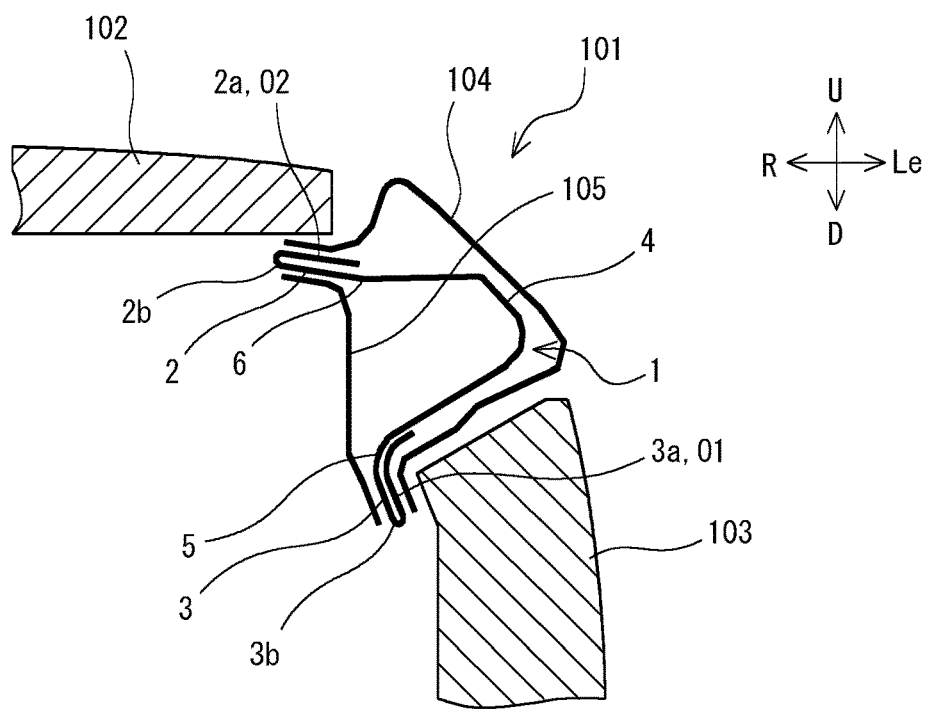
FIG. 3 is a cross-sectional view of the front pillar taken along a line III-III in FIG. 1.
Figure 4:
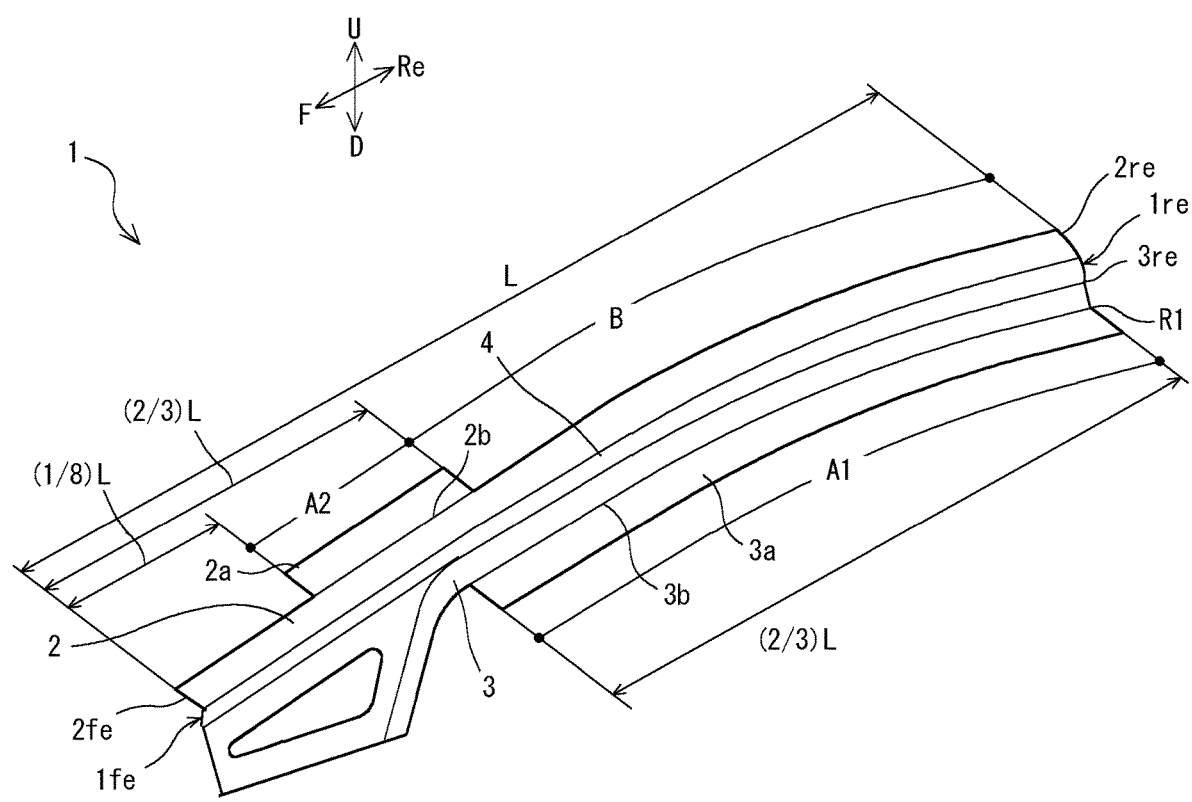
FIG. 4 is a perspective view of the front pillar outer shown in FIG. 1 in a step of the formation thereof.

FIG. 1 is a perspective view of an example of a front pillar outer 1 according to this embodiment. FIG. 2 is a cross-sectional view of a front pillar 101 taken along a line II-II in FIG. 1. FIG. 2 shows a cross section of a part of the front pillar outer 1 that is close to a rear end 1*re* thereof. The cross section shown in FIG. 2 includes a door-side compressive region A1. FIG. 3 is a cross-sectional view of the front pillar 101 taken along a line III-III in FIG. 1. FIG. 3 shows a cross section of a part of the front pillar outer 1 that is close to a fore end 1*fe* thereof. The cross section shown in FIG. 3 includes a glass-face-side compressive region A2 and the door-side compressive region A1. FIG. 4 is a perspective view of the front pillar outer 1 shown in FIG. 1 in a step of the formation thereof. The front pillar outer 1 shown in FIG. 1 to FIG. 4 is one of two front pillar outers of an automobile that is disposed on the left side of the automobile.

With reference to FIG. 2 and FIG. 3, the front pillar 101 supports a windshield 102. More strictly, the front pillar 101 referred to here is a front pillar upper forming a chassis of a vehicle body. The front pillar outer 1 is one of members forming the front pillar upper.

The front pillar 101 includes a side panel 104, a front pillar inner 105, and the front pillar outer 1. The side panel 104 is disposed on the outer side of the front pillar inner 105 and the front pillar outer 1. The side panel 104 and the front pillar inner 105 form a closed cross section. The front pillar outer 1 is disposed inside the closed cross section. The front pillar outer 1 serves to reinforce the front pillar 101.

With reference to FIG. 1 to FIG. 3, the front pillar outer 1 includes a glass-face-side flange part 2, a door-side flange part 3, and a main body part 4. The main body part 4 is disposed between the glass-face-side flange part 2 and the door-side flange part 3 in the width direction of the front pillar outer 1. The main body part 4 connects the glass-face-side flange part 2 and the door-side flange part 3 to each other.

The glass-face-side flange part 2 of the front pillar outer 1 is joined to the side panel 104 and the front pillar inner 105 by welding or the like. The glass-face-side flange part 2 includes an area that directly or indirectly supports a side edge of the windshield 102. The glass-face-side flange part 2 supports the side edge of the windshield 102 in cooperation with the side panel 104 and the front pillar inner 105.

The door-side flange part 3 is joined to the side panel 104 and the front pillar inner 105 by welding or the like. The door-side flange part 3 includes an area that is directly or indirectly opposed to an upper edge of the door 103. The door-side flange part 3 is opposed to the upper edge of the door 103 along with the side panel 104 and the front pillar inner 105. The cross-sectional shape of the front pillar outer 1 is a hat-like shape.

With reference to FIG. 1 to FIG. 4, the door-side flange part 3 includes the door-side compressive region A1. The door-side compressive region A1 is a partial area of the door-side flange part 3 along the longitudinal direction. A compressive strain is applied to the door-side compressive region A1 when a collision load is applied to the front pillar outer 1.

The glass-face-side flange part 2 includes the glass-face-side compressive region A2. The glass-face-side compressive region A2 is a partial area of the glass-face-side flange part 2 along the longitudinal direction. A compressive strain is applied to the glass-face-side compressive region A2 when a collision load is applied to the front pillar outer 1.

The glass-face-side flange part 2 further includes a glass-face-side tensile region B. The glass-face-side tensile region B is a partial area of the glass-face-side flange part 2 along the longitudinal direction. A tensile strain is applied to the glass-face-side tensile region B when a collision load is applied to the front pillar outer 1.

A first plate part 3a is disposed over the whole range of the door-side compressive region A1. In the door-side compressive region A1, the first plate part 3a is connected to a side edge 3b (see FIGS. 2 to 4) of the door-side flange part 3. The first plate part 3a is a part of the door-side flange part 3 protruding beyond the side edge 3b, and is integral with the door-side flange part 3. The first plate part 3a is folded onto the door-side flange part 3 and overlaid on the door-side flange part 3. In short, in the whole range of the door-side compressive region A1, two layers of material are stacked on one another. As a result, the thickness of the door-side compressive region A1 is substantially increased over the whole range thereof. Therefore, the buckling strength of the door-side compressive region A1 is significantly improved. In this way, the strength of the front pillar outer 1 can be increased.

Note that the first plate part 3a is not arranged in the other areas of the door-side flange part 3 than the door-side compressive region A1.

In the door-side compressive region A1, two members separately formed do not need to be joined to each other, and folding the first plate part 3a suffices. Therefore, the front pillar outer 1 can be inexpensively produced.

In the example shown in FIG. 1 to FIG. 4, the first plate part 3a is folded so as to be exposed to the outside of the door-side flange part 3, and is overlaid on the surface of the door-side flange part 3. A part of the first plate part 3a may lie over a ridge part 5 that connects the door-side flange part 3 and the main body part 4 to each other or may further lie over the main body part 4.

In the example shown in FIG. 1 to FIG. 4, an overlapping area O1 in which the first plate part 3a and the door-side flange part 3 overlap with each other agrees with the range of the door-side compressive region A1. In this specification, the overlapping area O1 is referred to also as a "door-side overlapping area". Provided that the length of the glass-face-side flange part 2 is denoted by L, the range of the door-side compressive region A1 is a range on the door-side flange part 3 between a position corresponding to the rear end 2re of the glass-face-side flange part 2 and a position at a distance of L×⅔ from the position corresponding to the rear end 2re of the glass-face-side flange part 2. Therefore, the door-side overlapping area O1 is provided over the whole range of the door-side compressive region A1. However, the door-side overlapping area O1 may be provided over a part of the range of the door-side compressive region A1. For example, the compressive strain may be small in an area close to the rear end 3re of the door-side flange part 3. In that case, the first plate part 3a need not be present in the area close to the rear end 3re of the door-side flange part 3.

A second plate part 2a is disposed over the whole range of the glass-face-side compressive region A2. In the glass-face-side compressive region A2, the second plate part 2a is connected to a side edge 2b (see FIGS. 3 and 4) of the glass-face-side flange part 2. The second plate part 2a is a part of the glass-face-side flange part 2 that protrudes beyond the side edge 2b, and is integral with the glass-face-side flange part 2. The second plate part 2a is folded onto the glass-face-side flange part 2 and overlaid on the glass-face-side flange part 2. In short, over the whole range of the glass-face-side compressive region A2, two layers of material are stacked on one another. As a result, the plate thickness of the glass-face-side compressive region A2 is substantially increased over the whole range thereof. Therefore, the buckling strength of the glass-face-side compressive region A2 is significantly improved. In this way, the strength of the front pillar outer 1 can be increased.

Note that the second plate part 2a is not arranged in the other areas of the glass-face-side flange part 2 than the glass-face-side compressive region A2.

In the glass-face-side compressive region A2, two members separately formed do not need to be joined to each other, and folding the second plate part 2a suffices. Therefore, the front pillar outer 1 can be inexpensively produced.

In the example shown in FIG. 1 to FIG. 4, the second plate part 2a is folded so as to be exposed to the outside of the glass-face-side flange part 2, and overlaid on the surface of the glass-face-side flange part 2. A part of the second plate part 2a may lie over a ridge part 6 that connects the glass-face-side flange part 2 and the main body part 4 to each other or may further lie over the main body part 4.

In the example shown in FIG. 1 to FIG. 4, an overlapping area O2 in which the second plate part 2a and the glass-face-side flange part 2 overlap with each other agrees with the range of the glass-face-side compressive region A2. In this specification, the overlapping area O2 is referred to also as a "glass-face-side overlapping area". Provided that the length of the glass-face-side flange part 2 is denoted by L, the range of the glass-face-side compressive region A2 is a range between a position at a distance of L×⅛ from the fore end 2fe of the glass-face-side flange part 2 and a position at a distance of L×⅔ from the fore end 2fe of the glass-face-side flange part 2. Therefore, the glass-face-side overlapping area O2 is provided over the whole range of the glass-face-side compressive region A2. However, the glass-face-side overlapping area O2 may be provided over a part of the range of the glass-face-side compressive region A2.

The glass-face-side tensile region B is located at the rear of the glass-face-side compressive region A2. The glass-face-side tensile region B is adjacent to the glass-face-side compressive region A2 and extends to the rear end 2*re* of the glass-face-side flange part 2. The second plate part 2*a* is not disposed in the glass-face-side tensile region B. Therefore, the glass-face-side tensile region B is made of a single material. Therefore, an increase of the weight can be reduced, and the weight of the front pillar outer 1 can be reduced by increasing the strength of the material.

The folding of each of the first plate part 3*a* and the second plate part 2*a* is achieved by hot stamping. The folding of each of the first plate part 3*a* and the second plate part 2*a* may be achieved by cold pressing. The folding of each of the first plate part 3*a* and the second plate part 2*a* may be performed in parallel with the formation of the front pillar outer 1. However, the folding of the plate parts may be performed before or after the formation of the front pillar outer 1.

[Deformation Behavior of Front Pillar Outer 1 and Relationship Between Compressive Strain Region and Tensile Strain Region in Collision]

As described above, in the door-side overlapping area O1 that corresponds to the door-side compressive region A1, two layers of material are stacked on one another. In the glass-face-side overlapping area O2 that corresponds to the glass-face-side compressive region A2, two layers of material are also stacked on one another. On the other hand, the glass-face-side tensile region B is made of a single material. Therefore, the plate thickness of a compressive strain region (the door-side compressive region A1 and the glass-face-side compressive region A2) is substantially greater than a tensile strain region (the glass-face-side tensile region B) and the other areas. Therefore, the collision resistance of the compressive strain region is higher than that of the tensile strain region and the other areas.

Figure 5:
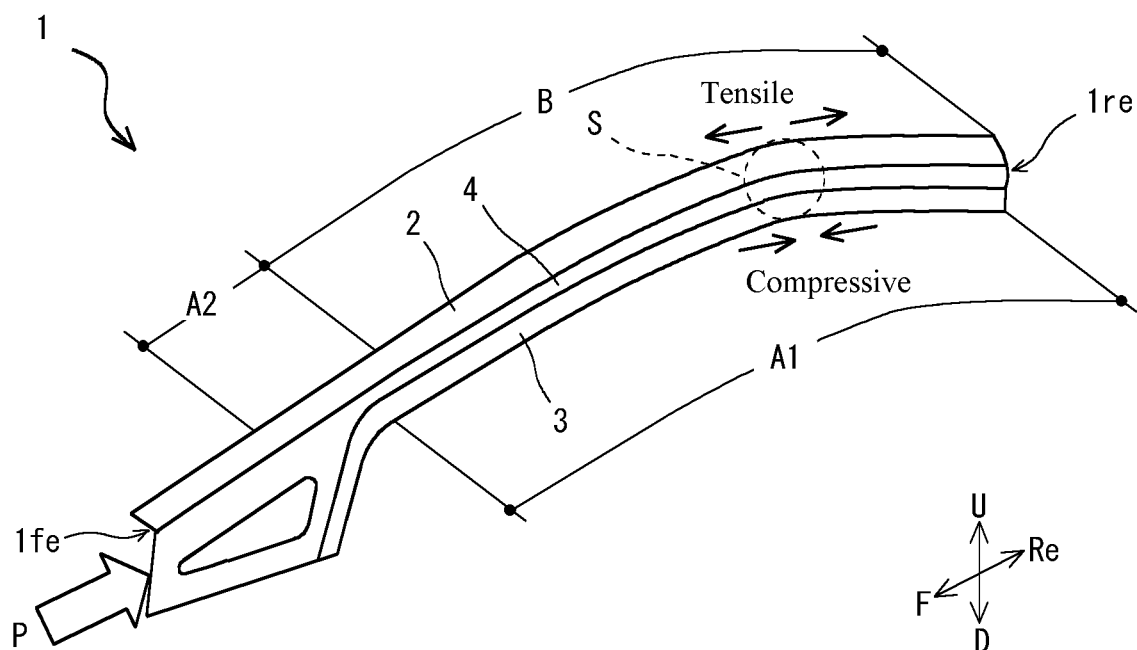
FIG. 5 is a perspective view of the front pillar outer on which a collision load is applied.

FIG. 5 is a perspective view of the front pillar outer 1 on which a collision load is applied. With reference to FIG. 5, in a state where the front pillar outer 1 is installed on an automobile, the fore end 1*fe* of the front pillar outer 1 is located at a lower position than the rear end 1*re*. In the case of a head-on collision of the automobile, a collision load P is applied to the fore end 1*fe* of the front pillar outer 1. The front pillar outer 1 has a curved shape, and is convex upward between the fore end 1*fe* and the rear end 1*re*. When the collision load P is applied to the front pillar outer 1, the stress is concentrated in the curved part of the front pillar outer 1, and the curved part is to be bent upward. As a result, a compressive stress occurs in the door-side flange part 3, and a compressive strain is exerted on the door-side flange part 3. On the other hand, a tensile stress occurs in the glass-face-side flange part 2, and a tensile strain is exerted on the glass-face-side flange part 2. The compressive stress occurring in the door-side flange part 3 and the tensile stress occurring in the glass-face-side flange part 2 exert a compressive strain on the glass-face-side flange part 2.

If the compressive strain excessively increases, the front pillar outer 1 buckles and is bent upward. If the front pillar outer 1 buckles, the collision energy absorption capacity of the front pillar outer 1 markedly decreases. Therefore, in order to increase the collision resistance of the front pillar outer 1, buckling of the front pillar outer 1 needs to be prevented.

To prevent buckling of the front pillar outer 1, it is effective to increase the collision resistance of the area of the door-side flange part 3 on which the compressive strain is exerted, that is, the door-side compressive region A1. Increasing the collision resistance of the area of the glass-face-side flange part 2 on which the compressive strain is exerted, that is, the glass-face-side compressive region A2, also contributes to the prevention of buckling of the front pillar outer 1.

With the front pillar outer 1, in an area S shown in FIG. 1, FIG. 2, and FIG. 5, the curvature of the door-side flange part 3 is large. The compressive strain is exerted on this area S. This area is the door-side compressive region A1. The compressive strain is also exerted on a part of the glass-face-side flange part 2. This area is the glass-face-side compressive region A2.

In the glass-face-side flange part 2, the tensile strain is exerted on an area at the rear of the glass-face-side compressive region A2. This area is the glass-face-side tensile region B.

The collision resistance (buckling strength) of the front pillar outer 1 largely depends on the plate thickness of the material of the compressive strain region. The plate thickness of the material of the tensile strain region has a smaller effect on the collision resistance of the front pillar outer 1 than the plate thickness of the material of the compressive strain region. Therefore, the plate thickness of the material of the glass-face-side tensile region B can be smaller than the plate thickness of the material of the door-side compressive region A1 and the glass-face-side compressive region A2.

Figure 6:
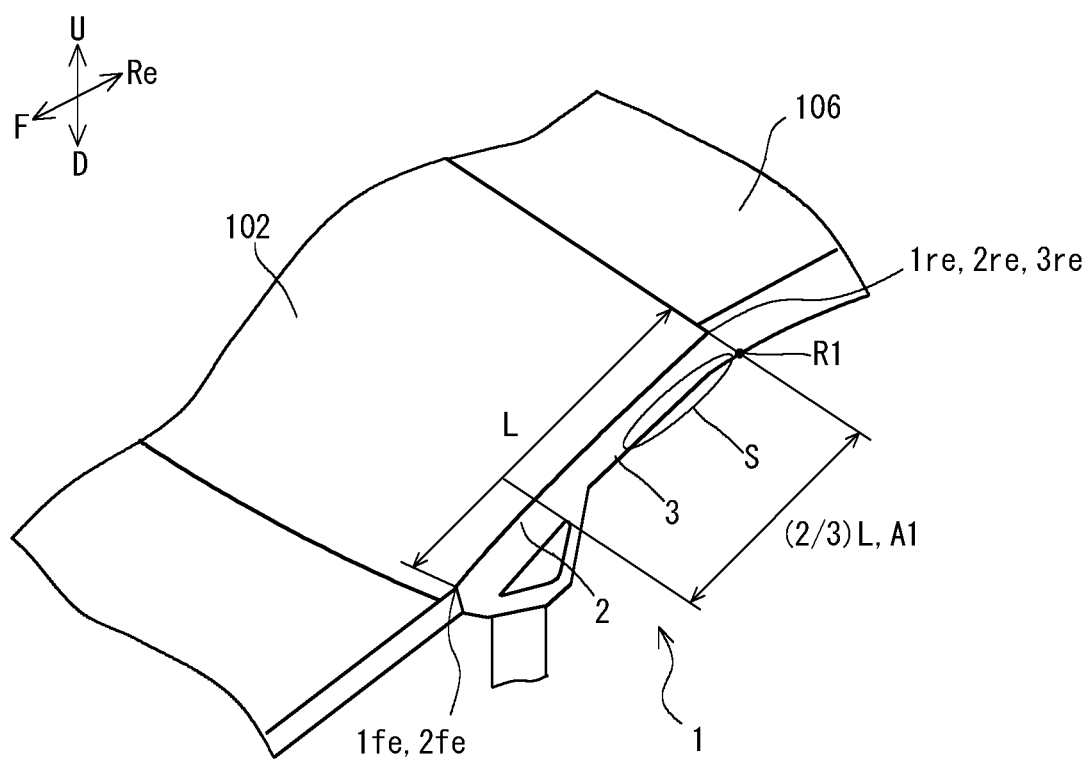
FIG. 6 is a schematic diagram showing a part of a vehicle body structure including the front pillar outer.

FIG. 6 is a schematic diagram showing a part of a vehicle body structure including the front pillar outer 1. In FIG. 6, illustration of the side panel of the front pillar is omitted. With reference to FIG. 6, the rear end of the front pillar is joined to a roof 106 of the vehicle. The roof 106 is provided to be approximately horizontal with respect to the ground. On the other hand, the windshield 102 of the vehicle is disposed to be inclined with respect to the ground. Therefore, the front pillar is curved in a part that is close to the rear end thereof. Accordingly, the front pillar outer 1 is also curved in a part that is close to the rear end 1*re* thereof.

When a collision load is applied to the front pillar outer 1, a large compressive strain is likely to occur in the door-side flange part 3 in the curved area S close to the rear end 1*re* of the front pillar outer 1. The shape of the front pillar outer 1 varies with the model. Therefore, the part in which a large compressive strain occurs varies with the model. In many cases, however, the area on which a compressive strain is exerted can be determined in a certain range. Specifically, as shown in FIG. 6, in the door-side flange part 3, a compressive strain is exerted in the range between a position R1 corresponding to the rear end 2*re* of the glass-face-side flange part 2 and a position at a distance of L×⅔ from the position R1 corresponding to the rear end 2*re* of the glass-face-side flange part 2. In short, this range is the range of the door-side compressive region A1. Here, L means the arc length (length in the longitudinal direction) of the glass-face-side flange part 2 of the front pillar outer 1 along the door-side edge thereof. The position R1 corresponds to the rear end 3*re* of the door-side flange part 3.

Therefore, as shown in FIG. 1, the door-side overlapping area O1 is provided over at least a part of the range of the door-side flange part 3 between the position R1 corresponding to the rear end 2*re* of the glass-face-side flange part 2 and the position at a distance of L×⅔ from the position R1 corresponding to the rear end 2*re* of the glass-face-side flange part 2. In other words, the door-side overlapping area O1 is provided over a part or the whole of the range of the door-side compressive region A1. FIG. 1 shows an example in which the door-side overlapping area O1 is provided over the whole range of the door-side compressive region A1.

Figure 7:
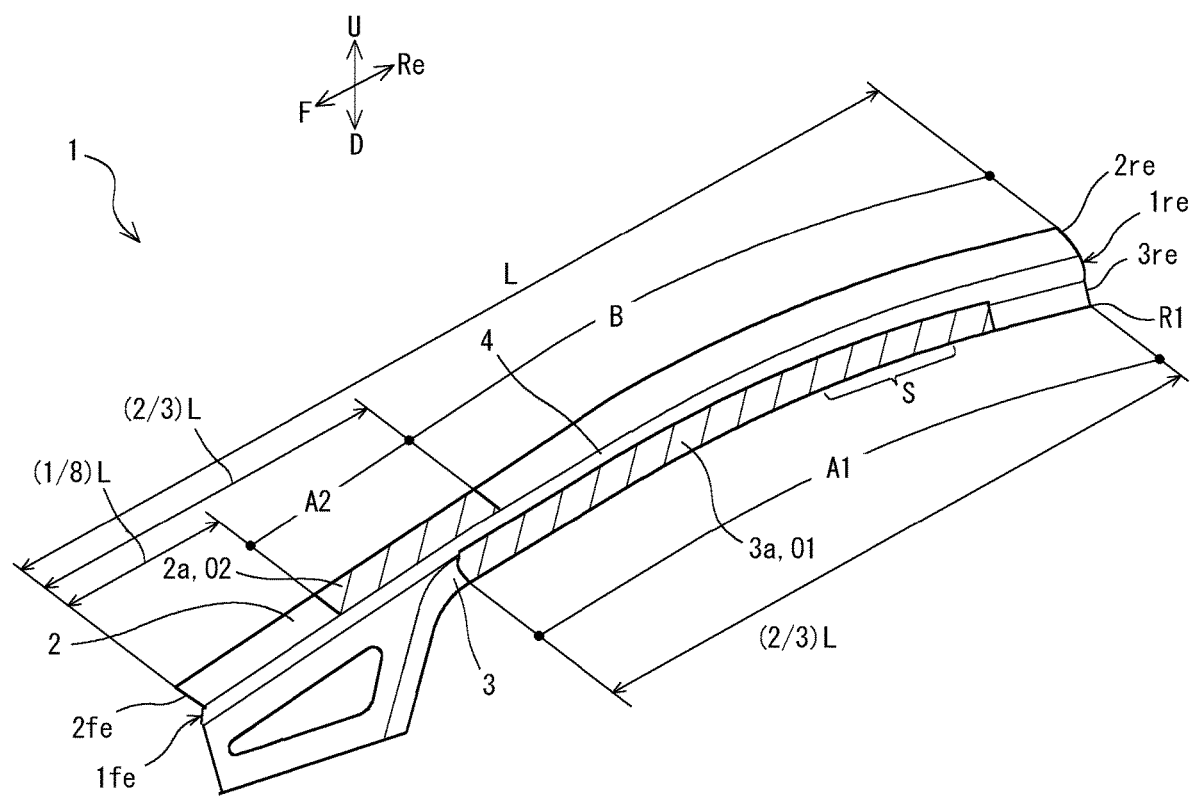
FIG. 7 is a perspective view of another example of the front pillar outer according to the embodiment.

FIG. 7 is a perspective view of another example of the front pillar outer 1 according to this embodiment. With the front pillar outer 1 shown in FIG. 7, the compressive strain is small in an area close to the rear end 3re of the door-side flange part 3. In this case, the first plate part 3a is not present in the area close to the rear end 3re of the door-side flange part 3. In other words, FIG. 7 shows an example in which the door-side overlapping area O1 is provided over a part of the door-side compressive region A1.

With reference to FIG. 1, when a collision load is applied to the front pillar outer 1, a large compressive strain is likely to occur in the glass-face-side flange part 2 close to the fore end 1fe of the front pillar outer 1. The compressive strain is caused by a compressive stress occurring in the door-side flange part 3 and a tensile stress occurring in the glass-face-side flange part 2. In many cases, the area on which the compressive strain is exerted can be determined in a certain range. Specifically, as shown in FIG. 1, in the glass-face-side flange part 2, the compressive strain is exerted in the range between a position at a distance of L×⅛ from the fore end 2fe of the glass-face-side flange part 2 and a position at a distance of L×⅔ from the fore end 2fe of the glass-face-side flange part 2. In short, this range is the glass-face-side compressive region A2. Here, L means the arc length (length in the longitudinal direction) of the glass-face-side flange part 2 of the front pillar outer 1 along the door-side edge thereof.

Therefore, as shown in FIG. 1, the glass-face-side overlapping area O2 is provided over at least a part of the range of the glass-face-side flange part 2 between the position at a distance of L×⅛ from the fore end 2fe of the glass-face-side flange part 2 and the position at a distance of L×⅔ from the fore end 2fe of the glass-face-side flange part 2. In other words, the glass-face-side overlapping area O2 is provided over a part or the whole of the range of the glass-face-side compressive region A2. FIG. 1 shows an example in which the glass-face-side overlapping area O2 is provided over the whole range of the glass-face-side compressive region A2.

[Plate Thickness]

With the front pillar outer 1, practically, the plate thickness is preferably 0.60 mm or more to 1.60 mm or less. When the plate thickness is 0.60 mm or more, a sufficient strength of the compressive strain region in which two layers of material are stacked on one another can be ensured. The same holds true for the tensile strain region and the other areas that are formed by a single layer of a single material. On the other hand, when the plate thickness is 1.60 mm or less, an increase of the weight can be reduced. In addition, when the plate thickness is 1.60 mm or less, the folding of the first plate part 3a and the second plate part 2a can be performed without problems.

[Tensile Strength]

With the front pillar outer 1, the tensile strength is preferably 800 MPa or more. When the tensile strength is 800 MPa or more, the strength of the compressive strain region in which two layers of material are stacked on one another can be sufficiently improved. The same holds true for the tensile strain region and the other areas that are formed by a single layer of a single material. The lower limit of the tensile strength is more preferably 1200 MPa, and even more preferably 1500 MPa.

[Folding of First Plate Part 3a and Second Plate Part 2a]

Folding of each of the first plate part 3a and the second plate part 2a is preferably achieved by hot stamping. In the case where the folding is achieved by hot stamping, the temperature of the material is high during the processing, and therefore, the ductility of the material is high. Therefore, even though the first plate part 3a is folded at an acute angle at the side edge 3b of the door-side flange part 3, no crack occurs in the folded part. Similarly, even though the second plate part 2a is folded at an acute angle at the side edge 2b of the glass-face-side flange part 2, no crack occurs in the folded part. However, the folding of each of the first plate part 3a and the second plate part 2a can also be achieved by cold pressing, depending on the properties of the material.

[Additional Techniques]

In the door-side overlapping area O1 corresponding to the door-side compressive region A1, the first plate part 3a and the door-side flange part 3 may be joined to each other. Similarly, in the glass-face-side overlapping area O2 corresponding to the glass-face-side compressive region A2, the second plate part 2a and the glass-face-side flange part 2 may be joined to each other. This is because, if the two layers of material stacked on one another are joined to each other, the strength of the compressive strain region is further improved.

The joining method is welding, for example. The welding method may be laser welding or spot welding, for example. The joining method may be mechanical fastening or bonding using an adhesive, for example. Some of these joining methods can also be used in combination. Of these joining methods, laser welding or spot welding are preferably used, since the productivity is high.

Example 1

To check the effectiveness of the front pillar outer according to this embodiment, computer aided engineering (CAE) analysis was performed. To evaluate the collision resistance, a collision test was simulated by CAE analysis. As models of Invention Examples 1 to 4, the front pillar outer 1 shown in FIG. 1 was fabricated. The models of Invention Examples 1 to 4 differ in plate thickness. As a model of Comparative Example, a front pillar outer not having the first plate part and the second plate part was fabricated. A fixed tensile strength of 1500 (MPa) was used for all the models.

[Analysis Conditions]

Figure 8:
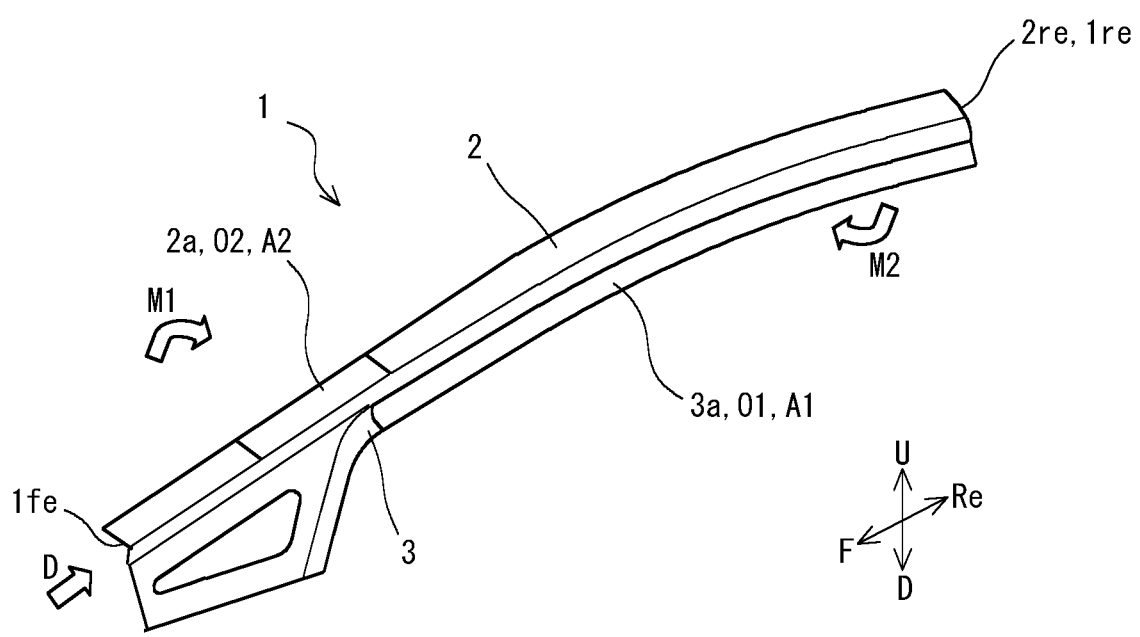
FIG. 8 is a schematic diagram for illustrating analysis conditions in Examples.

FIG. 8 is a schematic diagram for illustrating analysis conditions in Examples. With reference to FIG. 8, a displacement D in the longitudinal direction of the front pillar outer 1 was exerted on the fore end 1fe of the front pillar outer 1. On the other hand, the rear end 2re of the glass-face-side flange part 2 was fixed.

The displacement D caused bending moment M1 in the vicinity of the fore end 1fe of the front pillar outer 1. The direction of the bending moment M1 was clockwise when viewed from the left of the vehicle. It was assumed that the displacement D was positive when the displacement D was in the direction from the fore end 1fe to the rear end 1re of the front pillar outer 1. The displacement D caused a bending moment M2 in the rear end 2re of the glass-face-side flange part 2. The direction of the bending moment M2 was clockwise, as with the bending moment M1, when viewed from the left of the vehicle.

[Evaluation Method]

For each model, the load at the time when buckling occurred because of the exertion of the displacement D, that is, the maximum load, was investigated. Furthermore, the increase in percentage of the maximum load for each model was calculated with respect to the maximum load for the model of Comparative Example. The weight of each model was investigated. Furthermore, the decrease in percentage of the weight of each model was calculated with respect to the weight of the model of Comparative Example. The models were evaluated by comparison of the increase ratio of the maximum load and the weight reduction ratio.

[Results]

Table 1 below shows the results.

TABLE 1

| Example | Plate Thickness of Main Body (mm) | Total Plate Thickness of Area in which Plate is Overlaid (mm) | Weight Reduction Ratio (%) | Increase Ratio of Maximum Load (%) |
|---|---|---|---|---|
| Comparative Example | 1.25 | 1.25 | 0 (Reference) | 0 (Reference) |
| Invention Example 1 | 0.85 | 1.70 | 25.2 | 5 |
| Invention Example 2 | 0.95 | 1.90 | 16.4 | 8 |
| Invention Example 3 | 1.05 | 2.10 | 7.6 | 15 |
| Invention Example 4 | 1.15 | 2.30 | 2.0 | 20 |

The results in Table 1 show the following conclusions. The weight reduction ratio was more than 0 for all Invention Examples 1 to 4. In other words, the front pillar outers of Invention Examples 1 to 4 were lighter than the front pillar outer of Comparative Example. The increase ratio of the maximum load was more than 0 for all Invention Examples 1 to 4. In other words, the front pillar outers of Invention Examples 1 to 4 were improved in collision resistance (buckling strength) over the front pillar outer of Comparative Example.

Example 2

As in Example 1, CAE analysis was performed. In the models of Invention Examples 11 to 20 in Example 2, the main bodies had the same plate thickness of 1.05 mm, and the area in which the first plate part was provided and the area in which the second plate part was provided differed between the models. As a model of Comparative Example in Example 2, the model of Comparative Example in Example 1 (plate thickness: 1.25 mm) was used. Table 2 below shows conditions for the models that are different from those in Example 1. The other conditions were the same as those in Example 1.

TABLE 2

| Example | Area in which First Plate Part is Provided | Area in which Second Plate Part is Provided | Weight Reduction Ratio (%) | Increase Ratio of Maximum Load (%) |
|---|---|---|---|---|
| Comparative Example | Not Provided | Not Provided | 0 (Reference) | 0 (Reference) |
| Invention Example 11 | Part of Forward Area of A1 | Part of Forward Area of A2 | 14.7 | 3 |
| Invention Example 12 | Part of Forward Area of A1 | Part of B | 14.7 | 3 |
| Invention Example 13 | Part of A1 | Part of Forward Area of A2 | 13.6 | 4 |
| Invention Example 14 | Whole of A1 | Part of Forward Area of A2 | 12.3 | 5 |
| Invention Example 15 | Part of Forward Area of A1 | Part of A2 | 11.1 | 5 |
| Invention Example 16 | Part of Forward Area of A1 | Whole of A2 | 9.9 | 8 |
| Invention Example 17 | Part of A1 | Part of A2 | 9.9 | 11 |
| Invention Example 18 | Part of A1 | Whole of A2 | 8.8 | 13 |
| Invention Example 19 | Whole of A1 | Part of A2 | 8.8 | 13 |
| Invention Example 20 | Whole of A1 | Whole of A2 | 7.6 | 15 |

The results in Table 2 show the following conclusions. The weight reduction ratio was more than 0 for all Invention Examples 11 to 20. In other words, the front pillar outers of Invention Examples 11 to 20 were lighter than the front pillar outer of Comparative Example. The increase ratio of the maximum load was more than 0 for all Invention Examples 11 to 20. In other words, the front pillar outers of Invention Examples 11 to 20 were improved in collision resistance (buckling strength) over the front pillar outer of Comparative Example.

The results of the Examples 1 and 2 prove that the front pillar outer according to this embodiment is reduced in weight and improved in strength. In particular, the result of Example 2 proves that the reduction in weight and the improvement in strength can be more effectively achieved if the area in which the first plate part is provided, that is, the door-side overlapping area O1, is provided over a part or the whole of the door-side compressive region A1, and the area in which the second plate part is provided, that is, the glass-face-side overlapping area O2, is provided over a part or the whole of the glass-face-side compressive region A2.

An embodiment of the present invention has been described above. However, the embodiment described above is just an example of the mode for carrying out the present invention. Therefore, the present invention is not limited to the embodiment described above, and modifications can be made to the embodiment described above as required without departing from the spirit of the present invention.

REFERENCE SIGNS LIST

1 front pillar outer
1fe fore end of front pillar outer
1re rear end of front pillar outer
2 glass-face-side flange part
2a second plate part
2b side edge
2fe fore end of glass-face-side flange part
2re rear end of glass-face-side flange part
3 door-side flange part
3a first plate part
3b side edge
3re rear end of door-side flange part
4 main body part
5 ridge part
6 ridge part
A1 door-side compressive region A2 glass-face-side compressive region
B glass-face-side tensile region
O1 door-side overlapping area
O2 glass-face-side overlapping area
101 front pillar
102 windshield
103 door
104 side panel
105 front pillar inner
106 roof

The invention claimed is:

1. A front pillar outer including a glass-face-side flange part, a door-side flange part, and a main body part that connects the glass-face-side flange part and the door-side flange part to each other,
   wherein in a partial area of the door-side flange part in a longitudinal direction thereof, a first plate part that is connected to a side edge of the door-side flange part is folded so that the first plate part is overlaid on the door-side flange part, and
   in a partial area of the glass-face-side flange part in a longitudinal direction thereof, a second plate part that is connected to a side edge of the glass-face-side flange part is folded so that the second plate part is overlaid on the glass-face-side flange part.

2. The front pillar outer according to claim 1, wherein provided that a length of the glass-face-side flange part is denoted by L,
   the area in which the first plate part and the door-side flange part overlap with each other is provided in the door-side flange part over a part of a range between a position corresponding to a rear end of the glass-face-side flange part and a position at a distance of $L \times 2/3$ from the position corresponding to the rear end of the glass-face-side flange part.

3. The front pillar outer according to claim 1, wherein provided that a length of the glass-face-side flange part is denoted by L,
   the area in which the first plate part and the door-side flange part overlap with each other is provided in the door-side flange part over the whole of a range between a position corresponding to a rear end of the glass-face-side flange part and a position at a distance of $L \times 2/3$ from the position corresponding to the rear end of the glass-face-side flange part.

4. The front pillar outer according to claim 1, wherein provided that a length of the glass-face-side flange part is denoted by L,
   the area in which the second plate part and the glass-face-side flange part overlap with each other is provided over a part of a range between a position at a distance of $L \times 1/8$ from a fore end of the glass-face-side flange part and a position at a distance of $L \times 2/3$ from the fore end of the glass-face-side flange part.

5. The front pillar outer according to claim 1, wherein provided that a length of the glass-face-side flange part is denoted by L,
   the area in which the second plate part and the glass-face-side flange part overlap with each other is provided over the whole of a range between a position at a distance of $L \times 1/8$ from a fore end of the glass-face-side flange part and a position at a distance of $L \times 2/3$ from the fore end of the glass-face-side flange part.

* * * * *